No. 786,408.

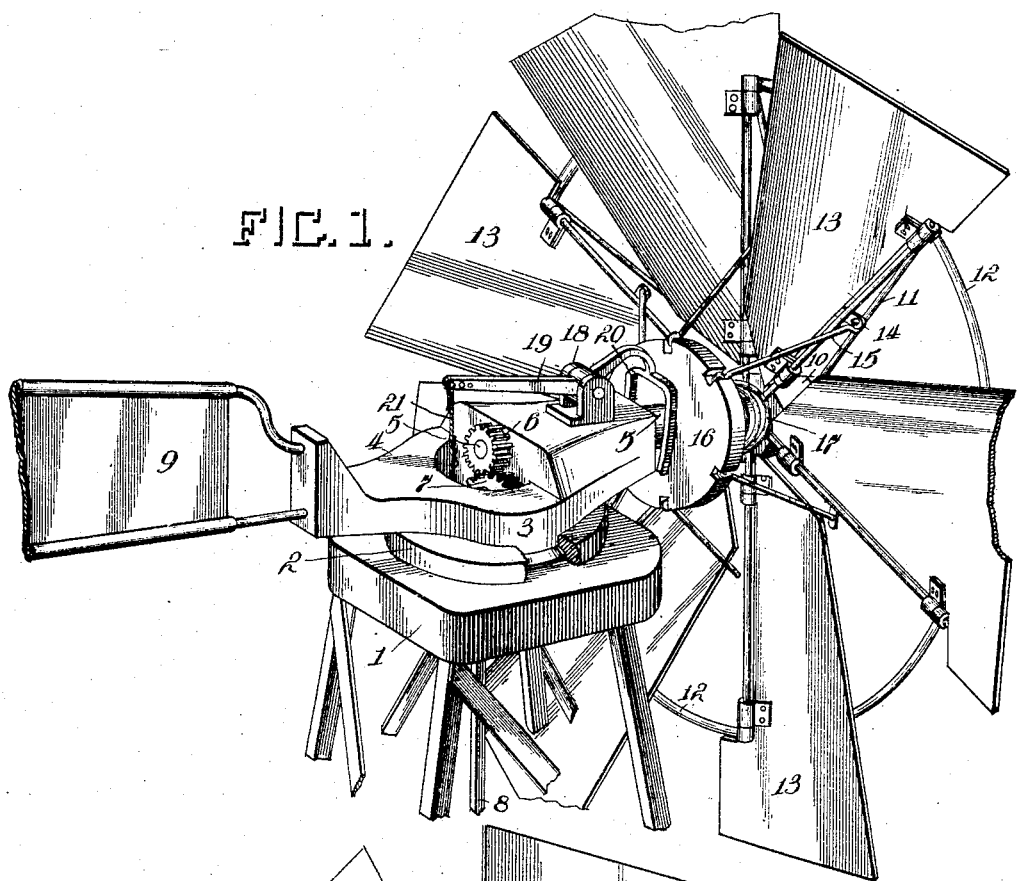
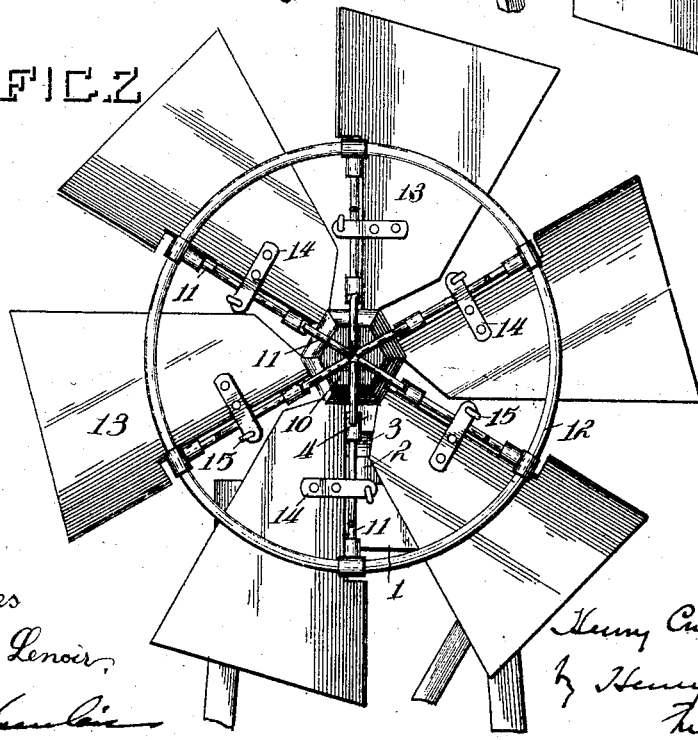

Patented April 4, 1905.

UNITED STATES PATENT OFFICE.

HENRY CONDIFF BURNETT, OF FORT MAGINNIS, MONTANA.

WINDMILL.

SPECIFICATION forming part of Letters Patent No. 786,408, dated April 4, 1905.

Application filed July 27, 1904. Serial No. 218,388.

*To all whom it may concern:*

Be it known that I, HENRY CONDIFF BURNETT, a citizen of the United States, residing at Fort Maginnis, county of Fergus, and State of Montana, have invented certain new and useful Improvements in Windmills, of which the following is a specification.

My invention relates to windmills, and more especially to that class of mills known in the art as "feathering-blades;" and the object thereof is to provide a mill which will automatically stop upon the excess of air-current forced against the blades or which will automatically adjust itself to run at a given speed no matter how hard the wind is blowing.

A further object of the invention is the provision of means whereby the device may be stopped manually.

The invention consists in the novel features and combination of parts, which will be more fully hereinafter described and the novel features pointed out in the appended claims.

In the drawings, Figure 1 represents a rear perspective, and Fig. 2 represents a front elevation.

Referring more specially to the drawings, 1 represents the head of the windmill-standards, to which is secured a socket 2, adapted to receive a head 3. This head 3 is rigidly secured to the castings 4, in which the main shaft 5 of the wheel is journaled, and the head 3 is revolubly secured in the socket 2, so as to permit the mill to revolve to different points of the compass, so as to at all times face the wind. The shaft 5 is provided at its inner end with a gear 6, adapted to mesh with a similar and larger gear 7, to which is secured the crank-arm 8, transmitting motion to the pump or other device adapted to be run by the windmill. The mill is also provided with the necessary rudder-vane 9, secured in any suitable manner to the casting 4. At the other end of the shaft 5 is secured a head 10, and extending radially therefrom are arms 11, which extend outwardly and upwardly a certain distance and are connected with a ring 12 and are bent back upon themselves, forming arms 12', which are connected to the inner part of the head 10. Journaled upon these arms 12' are the usual wings or sails 13 of the wheel, and these are provided with lugs or ears 14, projecting from the right side thereof. Loosely secured within these ears or lugs are arms 15, which run back substantially parallel with the shaft 5 and are pivotally secured to a disk 16, which loosely surrounds the shaft 5 and is adapted for longitudinal movement thereon. This disk is held in normal position by a spiral spring 17, which surrounds the shaft 5 and which normally keeps the disk away from the head 10.

Secured upon the top of the casting 4 is a bearing 18, in which is pivoted a forked lever 19, the forked end 20 of which is adapted to engage the rear of the disk 16, and the opposite end thereof is connected by a rope 21 to the ground or near the bottom of the mill, where the operator can grasp the rope and operate the forked lever.

The spring 17 is made of such tension as to normally keep the blades in their proper position, so that the wind will revolve the mill; but upon a predetermined excess of wind the blades will turn and pull upon the arms 15, so that the disk 16 is moved forward toward the head 10, and the blades straighten themselves out toward the wind more or less, according to the pressure exerted. If the wind is excessively strong, the blades straighten out or feather somewhat, so that the wind passes through and only exerts so much pressure as will properly operate the mill, and when again the wind subsides the action of the spring forces the disk from the head 10 and the blades are carried back to their normal position or as far as they will be allowed to go, according to the pressure of the wind exerted thereon. When it is desired to stop the mill by hand, a pull is exerted upon the rope and the lever 19 is operated, so that the forked end 20 is made to push upon the disk 16 and shove it outward toward the head 10, thus forcing the wings of the mill to a position at right angles to the ring 12. This allows the wind to pass straight through without exerting any operating force upon the blades.

Having thus described my invention, what I claim as new, and desire to secure by Letters Patent, is—

1. In a wind-wheel, the combination with a wheel-shaft, of a head rigidly secured thereto, arms projecting from the rear of said head, brace-arms projecting from the front of said head, a ring connecting said arms and spacing them apart, blades journaled on said rear arms, and means surrounding said shaft for normally keeping said blades in operative position.

2. In a wind-wheel, the combination with a wheel-shaft, of a head rigidly secured thereto, brace-arms projecting radially from the front of said head, arms projecting radially from the rear of said head, a ring connecting said arms and spacing them apart, blades journaled on said rear arms and projecting beyond said ring, and means for normally keeping them in operative position.

3. In a wind-wheel, the combination with a wheel-shaft, of a head rigidly secured thereto, brace-arms projecting radially from the front of said head, said arms being bent back upon themselves and forming other arms which are secured to the rear of said head, a ring connecting said arms and spacing them apart, blades journaled on said rear secured arms, a disk surrounding said shaft, a spiral spring surrounding said shaft between the head and the disk adapted to normally force the disk away from the head, rods connecting the disk with said blades, and a forked lever adapted to engage the disk to force it toward the head and thereby turn the blades.

In testimony whereof I hereunto affix my signature in presence of two witnesses.

HENRY CONDIFF BURNETT.

Witnesses:
   F. W. ANDERSON,
   P. C. MEYDERT.